US012600165B2

(12) United States Patent
Greene

(10) Patent No.: US 12,600,165 B2
(45) Date of Patent: Apr. 14, 2026

(54) PROTECTIVE KIT FOR USE WHEN APPLYING A COATING TO A VEHICLE WHEEL

(71) Applicant: JACOBS & THOMPSON INC., Toronto (CA)

(72) Inventor: Robert Greene, On (CA)

(73) Assignee: JACOBS & THOMPSON INC., Toronto (CA)

( * ) Notice: Subject to any disclaimer, the term of this patent is extended or adjusted under 35 U.S.C. 154(b) by 444 days.

(21) Appl. No.: 18/295,173

(22) Filed: Apr. 3, 2023

(65) Prior Publication Data

US 2023/0322019 A1 Oct. 12, 2023

Related U.S. Application Data

(60) Provisional application No. 63/326,914, filed on Apr. 3, 2022.

(51) Int. Cl.
*B60B 7/06* (2006.01)
*B05B 12/30* (2018.01)
*B60J 11/10* (2006.01)

(52) U.S. Cl.
CPC .............. *B60B 7/063* (2013.01); *B05B 12/30* (2018.02); *B60J 11/10* (2013.01)

(58) Field of Classification Search
CPC ......... B05B 12/30; B05B 12/24; B60B 7/063; B60J 11/10; B60J 11/06
USPC .......................................... 301/37.103, 37.22
See application file for complete search history.

(56) References Cited

U.S. PATENT DOCUMENTS

2016/0144385 A1* 5/2016 Espaillat ................... B60B 7/01
239/104

FOREIGN PATENT DOCUMENTS

GB 2299553 A * 10/1996 ............. B05B 12/30

OTHER PUBLICATIONS

Screenshots of YouTube video titled Masking A Wheel & Tyre For Painting The Fast Way!—Paint Prep 101 (Year: 2021).*
YouTube video posted by Honda Guru of Williamsberg entitled How to paint your wheels while on the vehicle. Hope it helps you.—https://www.youtube.com/watch?v=hv0_sk6jPoM—Jul. 21, 2021.

* cited by examiner

*Primary Examiner* — S. Joseph Morano
*Assistant Examiner* — Alex Palmer
(74) *Attorney, Agent, or Firm* — Aird & McBurney LP

(57) ABSTRACT

In an aspect, a protective kit for a vehicle wheel is provided. The wheel includes a rim with a pressurized tire mounted thereon. An outboard flange of the rim and an outboard side of the tire are resiliently engaged. The kit includes a wheel cover member including a cover sheet with outer and inner edges, and a through-opening, and an elastic member connected to the cover sheet at the inner edge. The through-opening and elastic member can encircle the outboard flange of the rim. The kit further includes a plurality of driving cards, each having a selected rigidity and a selected thickness so as to be pushable against the wheel cover member in between the outboard side of the tire and the rim, so as to drive the wheel cover member radially inwardly between the outboard side of the tire and the rim.

8 Claims, 13 Drawing Sheets

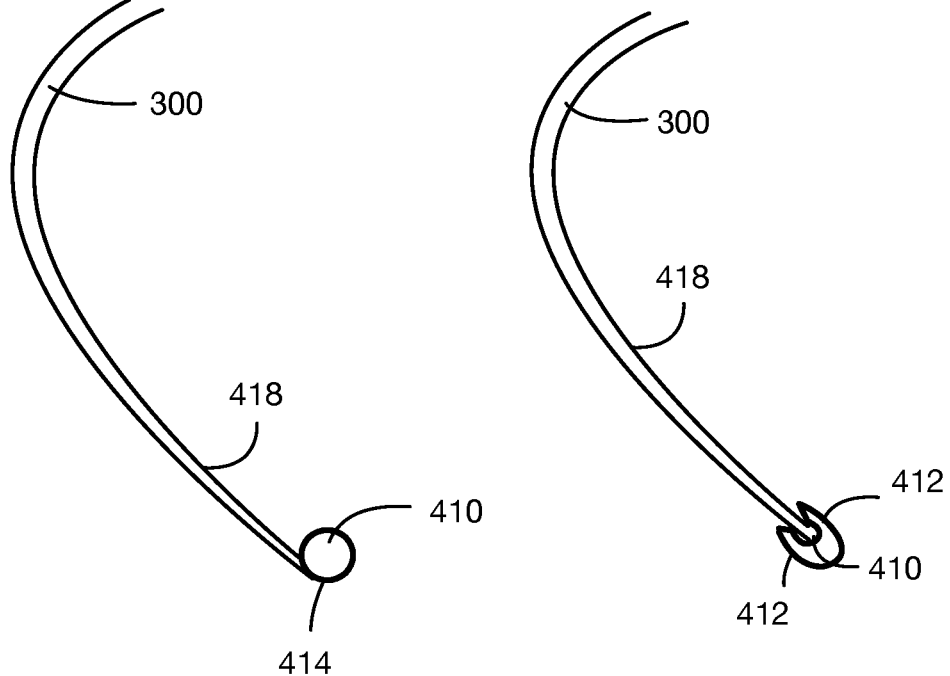
FIG. 4C          FIG. 4D

600
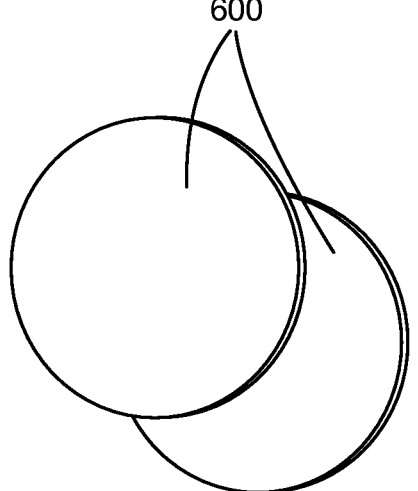
600
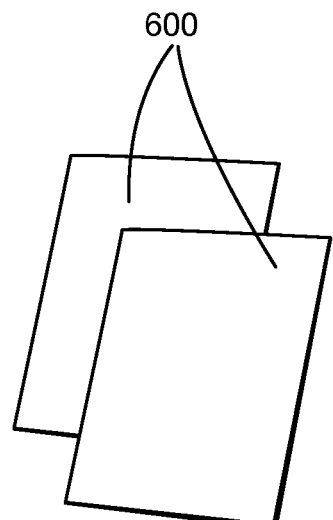
FIG. 6A
FIG. 6B

PROTECTIVE KIT FOR USE WHEN APPLYING A COATING TO A VEHICLE WHEEL

FIELD OF THE INVENTION

The present disclosure relates generally to means for protecting parts of a vehicle during painting procedures. In particular, the disclosure relates to a protective kit for a vehicle wheel.

BACKGROUND OF THE INVENTION

It is becoming increasingly common for car owners to paint the wheel rims of the wheels on their vehicle to achieve a change in the appearance of the vehicle. For the initial painting and repainting of a rim, it is known to paint the wheel rim without removing the tire from the wheel rim in order to reduce the time and labor involved in removing and remounting the tire on the wheel rim.

It is also known to protect the surfaces of the tire from the paint applied to the wheel rim by applying various protective covers. It is known to protect the tire during painting with adhesive tape and paper. However, this method requires a great deal of time and material. It is also known to use a rigid insertable template made of cardboard or solid paper, which has a circular recess that is larger in diameter than the flange of a variety of wheel rims to be machined with such a template.

It is also known to provide a covering bag which is pulled around the circumference of the tire and includes a through hole that is secured around the wheel rim. In this case, however, the inside of the wheel rim flange and the wheel rim base are not protected, so fine paint drops can enter this area and contaminate internal mechanisms of the vehicle that are mounted behind the wheel rim of the wheel (e.g., brake calipers).

It is therefore an object of some embodiments of the present disclosure to provide a novel protective kit for a vehicle wheel that can be easily and securely fastened between the wheel rim and the tire, and which can be used to block paint from travelling through the wheel rim itself.

SUMMARY OF THE DISCLOSURE

In an aspect, a protective kit for a vehicle wheel is provided. The vehicle wheel includes a wheel rim which has a tire mounted thereon. The tire is pressurized, such that an outboard flange of the wheel rim and an outboard side of the tire are resiliently engaged with one another and are separable. The protective kit includes a wheel cover member that includes a cover sheet and an elastic member. The cover sheet has an outer edge and an inner edge, and has a through-opening passing therethrough that is defined by the inner edge. The elastic member is connected to the cover sheet at the inner edge. The through-opening and the elastic member are sized to be openable to encircle the outboard flange of the wheel rim. The protective kit further includes a plurality of driving cards. Each of the plurality of cards has a selected rigidity and a selected thickness so as to be pushable against the wheel cover member in between the outboard side of the tire and the outboard flange of the wheel rim, so as to drive the wheel cover member radially inwardly between the outboard side of the tire and the outboard flange of the wheel rim, thereby separating at least a radially outer portion of the outboard flange of the wheel rim from the outboard side of the tire with the wheel cover member.

BRIEF DESCRIPTION OF THE DRAWINGS

Embodiments will now be described, by way of example only, with reference to the attached Figures, wherein:

FIG. 4C shows a cross-sectional view of an embodiment of the cover sheet attached to an outer surface of an elastic member;

FIG. 4D shows a cross-sectional view of an embodiment of the cover sheet attached within an elastic member;

FIG. 6A is a perspective view of an embodiment of a plurality of cards that may be included in the protective kit;

FIG. 6B is a perspective view of another embodiment of a plurality of cards that may be included in the protective kit;

DETAILED DESCRIPTION OF THE EMBODIMENTS

Figure 1A:
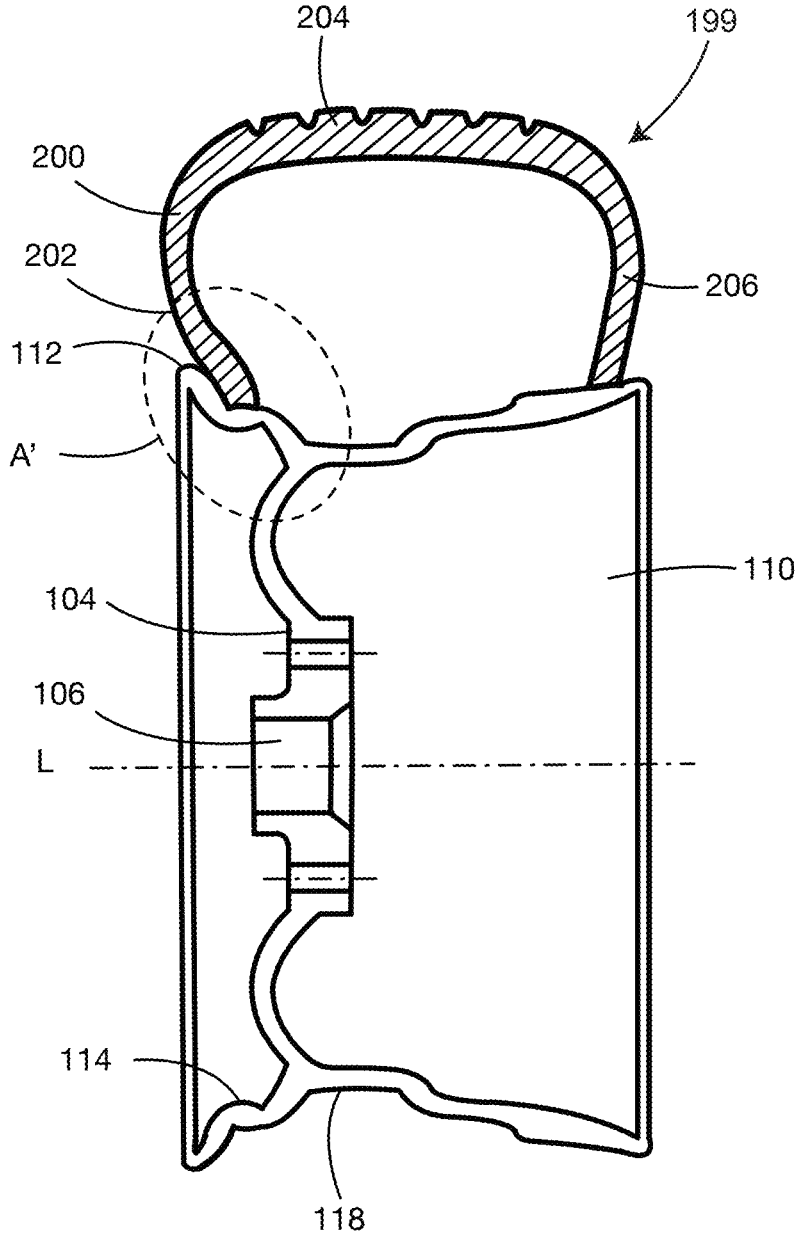
FIG. 1A is a cross-sectional view of a vehicle wheel including a wheel rim and a tire.

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details.

In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

In an aspect, the present disclosure relates to a protective kit for a vehicle wheel (which includes a wheel rim and a tire), where the protective kit is applied to protect the tire by preventing a rim coating (such as paint, for example) from adhering to the tire as the coating is applied to the wheel rim.

The vehicle wheel to which the protective kit is applied can be any one of a range of known vehicle wheels having a variety of configurations on a variety of vehicles. The vehicle may be, for example, an automobile, an SUV, a pick-up truck, a cube van, a minivan, or any other suitable kind of vehicle.

Figure 1B:
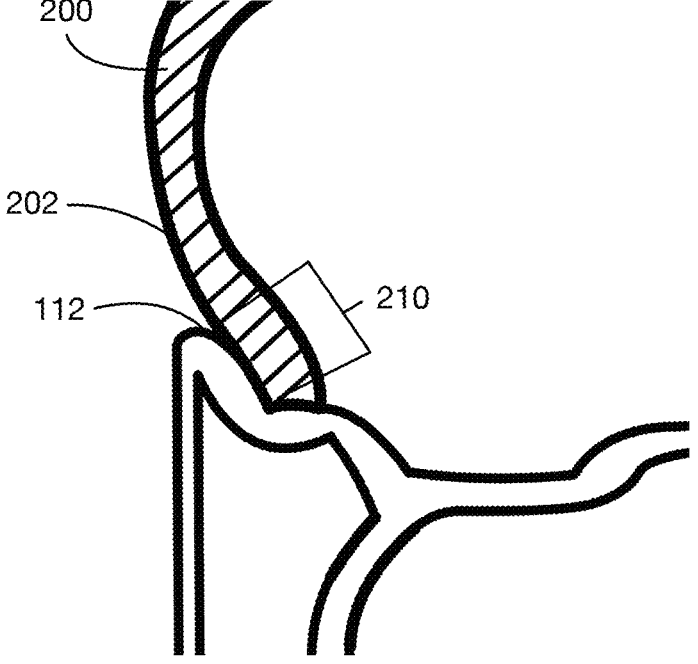
FIG. 1B is a magnified cross-sectional view of a region A' in FIG. 1A.
Figure 2:
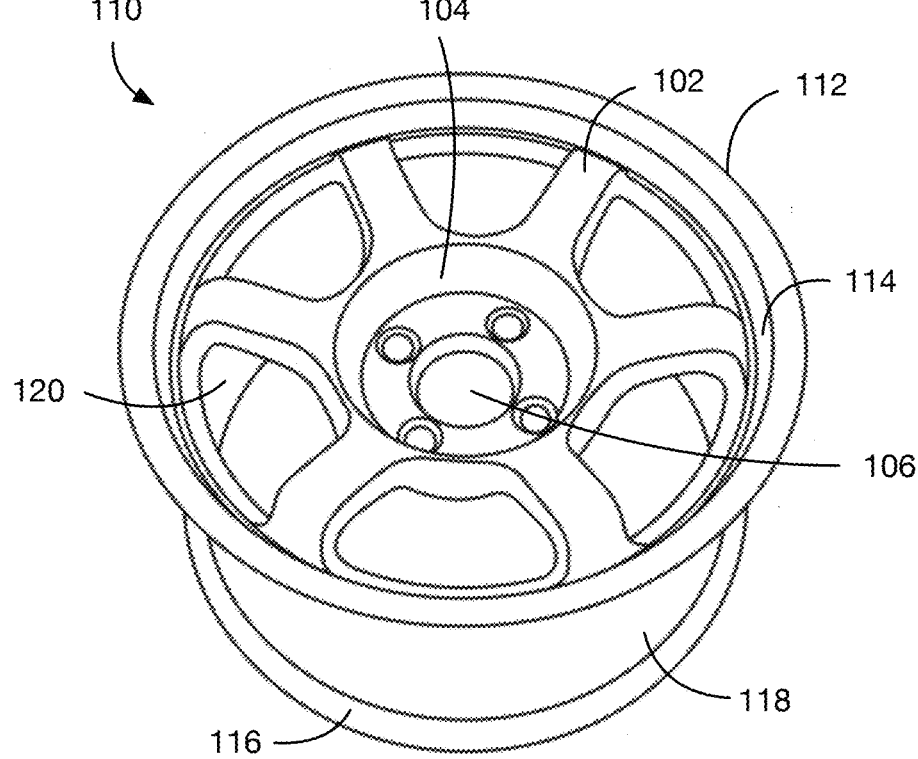
FIG. 2 is a perspective view of the wheel rim of a vehicle wheel shown in FIG. 1A.

An example vehicle wheel is shown in FIGS. 1A, 1B, and 2 at 199. The vehicle wheel 199 (which may also be referred to as the wheel 199, for simplicity), includes a wheel rim 110 and a tire 200. FIG. 2 shows another view of the wheel rim 110.

In the embodiment shown in FIGS. 1A, 1B, and 2, the wheel rim 110 includes a plurality of spokes 102, a center disk 104, which may include a through bore 106. The rim 199 has a longitudinal axis L.

The wheel rim 110 also includes a main through-channel 120 extending between an outboard side of the wheel rim 110 and a rear side of the wheel rim 110. The wheel rim 110 also includes a barrel 118 and a pair of flanges disposed on opposing sides thereof including an outboard flange 112 and an inboard flange 116. In the embodiment of the wheel rim 110 presented in FIG. 2, the wheel rim 110 includes an outer lip 114, which is the part of the wheel rim 110 facing inward, spanning from the spokes 102 to the outboard flange 112 of the wheel rim 110. The outboard and inboard flanges 112 and 116 function to prevent the slippage of the tire 200 (FIG. 1A) off the wheel rim 110. The outboard flange 112 has an outer edge shown at 113 and has a diameter Dw.

The tire 200 is pressurized, such that the outboard flange 112 of the wheel rim 110 and an outboard side (shown at 202) of the tire 200 are resiliently engaged with one another.

The region of engagement between the outboard flange 112 and the outboard side 202 of the tire 200 may be referred to as the interface 210. When the tire 200 is in a fully inflated state (as shown in FIG. 1A), such that it is suitable for operation of the vehicle, the outboard side 202 of the tire 202 is pressed firmly against the outboard flange 112 at the interface 210.

FIG. 1B shows a magnified view of the region A' in FIG. 1A, showing the interface 210 between the outboard side 202 of the tire 200 and the outboard flange 112 of the wheel rim 110.

In an embodiment, the extent to which the outboard side 202 of the tire 200 and the portion of the wheel rim 110 are resiliently engaged can be altered by removing air from the tire 200. For example, air can be removed from the tire 200 to deflate the tire 200 partially such that a force between the tire 200 and the outboard flange 112 decreases. It is not necessary to completely deflate the tire 200 however. As such, it is possible to keep the wheel 199 on the vehicle and even to keep the vehicle on the ground, supported by its wheels (including wheel 199). For greater certainty, the term 'pressurized' may mean that the tire is fully inflated as noted above, or is partially deflated but still sufficiently inflated to be able to support the vehicle without collapsing of its sidewalls completely.

Figure 3:
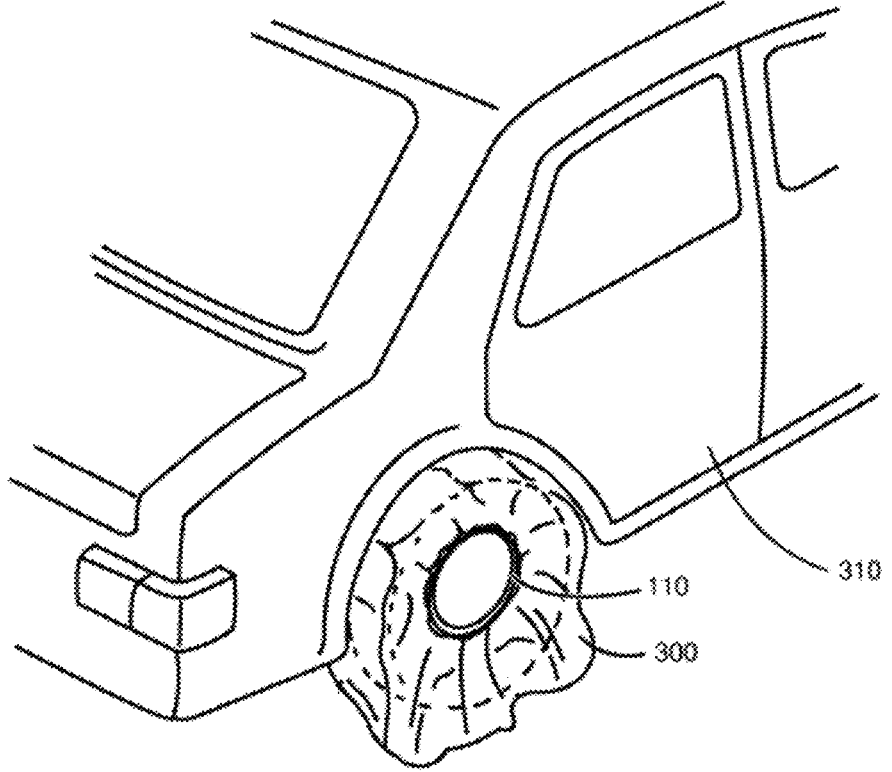
FIG. 3 is a perspective view of an embodiment of a protective kit applied to a wheel of a vehicle.
Figure 9:
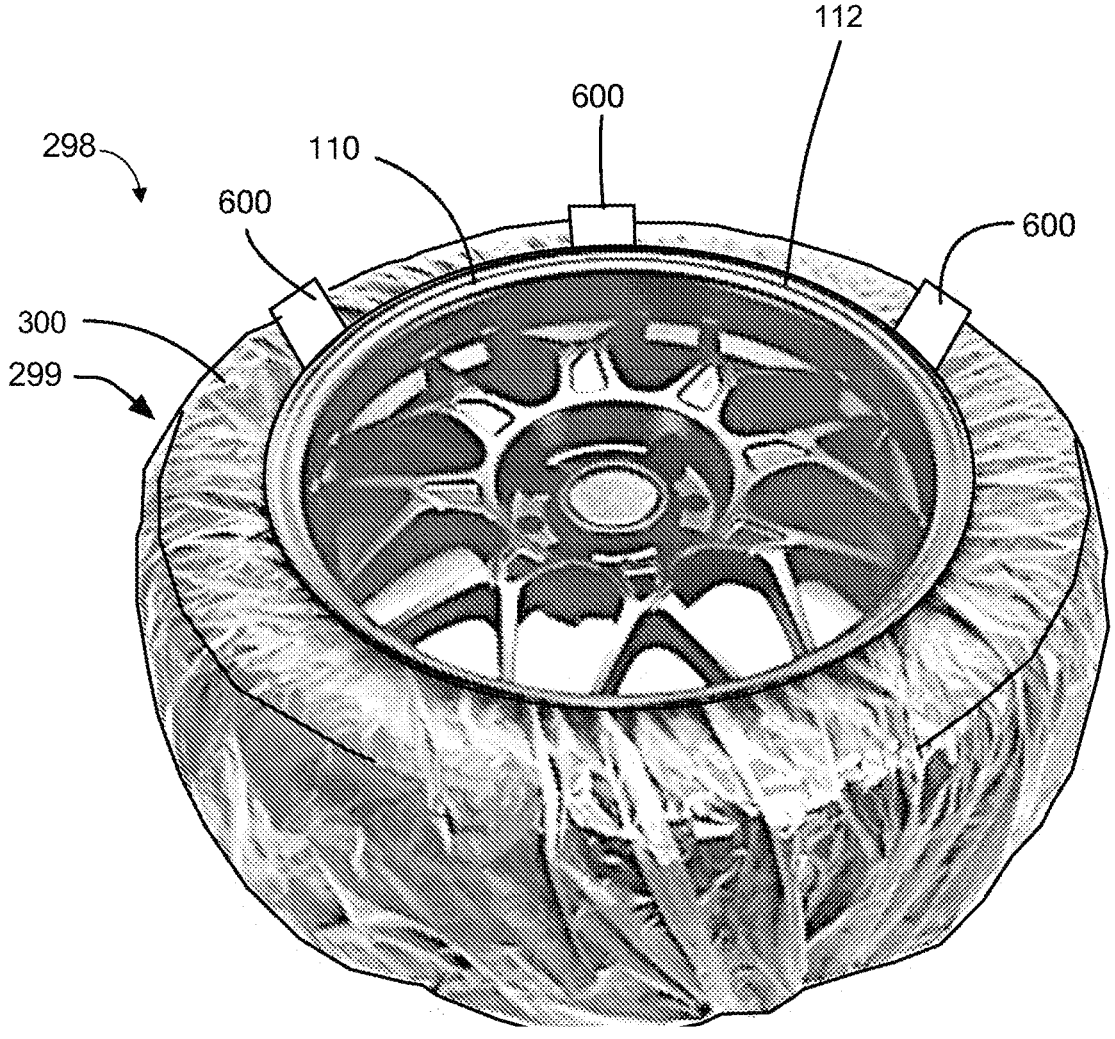
FIG. 9 shows a perspective view of the cover sheet being applied to the tire of a vehicle using the plurality of cards.

FIG. 3 shows the wheel 199 mounted to a vehicle 310 (in this example, an automobile). In FIG. 9, the protective kit is shown at 298 and includes a wheel cover member 299 and a plurality of driving cards 600. In this embodiment, each of the driving cards 600 has a width, and a sum of the widths of all the driving cards 600 is less than a circumference of the outboard flange 112 of the wheel rim 110. The wheel cover member 299 as disclosed herein is shaped to cover the tire 200 of the wheel 199 during painting of (or applying some other coating to) the wheel rim 110 of the wheel 199, while the wheel 199 remains mounted to the vehicle 310.

FIG. 3 also shows the wheel cover member 299 which includes a cover sheet 300 and an elastic member 410. The cover sheet 300 has an outer edge 402, an inner edge 404, and has a through-opening 406 that passes therethrough, (i.e. passes through the cover sheet 300). The elastic member 410 is connected to the cover sheet 300 at the inner edge 404. The through-opening 406 and the elastic member 410 are sized to be openable to encircle the outboard flange 112 of the wheel rim 110.

Figure 4A:
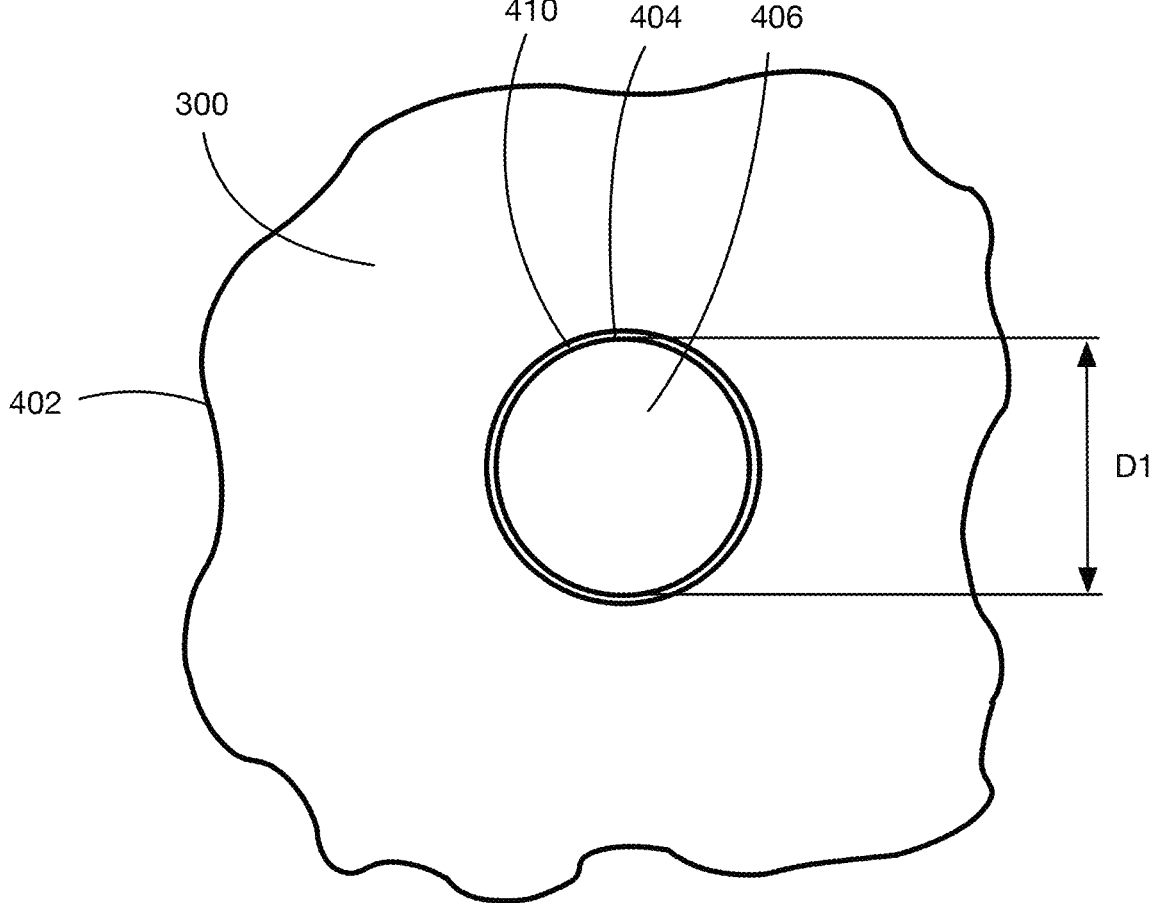
FIG. 4A is a plan view of an embodiment of the cover sheet having a circular form.

Referring to FIG. 4A, an embodiment of the cover sheet 300 is provided. In this embodiment, the through-opening 406 is circular and is positioned centrally thereon. In the embodiment shown, the through-opening 406 and the elastic member 410 have an unstretched shape (shown in solid lines) which may be a circle, having an unstretched diameter D1 which is smaller than the diameter Dw of the outboard flange 112 of the wheel rim 110, and a stretched shape which may also be a circle, having a diameter D2 that is larger than the diameter Dw of the outboard flange 112, thereby permitting the through aperture to be opened as needed to encircle the outer edge 113 of the outboard flange 112 and to sit on the outer edge 113 with some force, due to the restoring force that is present in the elastic member 410 urging the elastic member 410 towards its unstretched shape. As a result, as noted above, the through-opening 406 and the elastic member 410 are sized to be openable to encircle the outboard flange 112 of the wheel rim 110.

It will be understood that the reference above to an unstretched shape refers to the shape of the through-opening 406 and the elastic member 410 when the elastic member 410 is unstretched. When the through-opening 406 and the elastic member 410 are positioned in their stretched shape, the material of the cover sheet 300 itself remains unstretched—it is the elastic member 410 that is stretched. To achieve this, the cover sheet 300 at the inner edge 404 may be attached (e.g. sewn) to the elastic member 410 when the elastic member 410 is stretched, and then when the elastic member 410 is released afterwards (e.g. after the sewing is completed), the elastic member 410 returns to its unstretched size and the shape and the inner edge 404 acquires a number of folds as needed to accommodate the smaller size of the elastic member 410 when the elastic member 410 is unstretched.

It will be understood that the through-opening 406 does not have to be a perfect circle, in various embodiments, the through-opening 406 of the cover sheet 300 can have a generally circular form, a generally elliptical form, or a variety of other forms that nonetheless allow it to be openable to encircle the outboard flange 112 of the wheel rim 110.

In an embodiment, the cover sheet 300 is formed of at least one plastic material. The cover sheet 300 may alternatively be formed of a plastic material that is substantially elastic.

In an additional embodiment, the at least one plastic material of the cover sheet 300 is a plastic material that is any one of a transparent plastic material, a translucent plastic material and an opaque plastic material.

In an additional embodiment, the cover sheet 300 is comprised of one or more layers of suitable material.

In the embodiment where the cover sheet 300 comprises a single layer of material, the single layer may be fabricated from a plastic material that is waterproof, water-resistant, or similar liquid-proof or liquid-impermeable plastic materials.

In a further embodiment of the present disclosure, the cover sheet 300 is formed as a kind of sack having at least two layers. These layers are connected to each other around the inner edges 404 and outer edges 402 of each of the layers thereof.

In the embodiment where the cover sheet 300 is comprised of two layers, the first layer is an exterior layer of waterproof material and a second layer may be an interior layer of soft water-absorbent material. In a further embodiment of the cover sheet 300 being formed of at least two layers, the elastic member 410 is formed to be at least partly hollow and to include a recess on an exterior portion thereof such that the inner edge of each of the two layers can be fed into the hollow interior of the elastic member and connected therein.

In an embodiment, the cover sheet 300 is at least partially covered in a film of a material that is paint-adherent. The film of the paint-adherent material limits the contamination of other surfaces by particles of the paint which flake off after drying on the cover sheet 300.

Figure 4B:
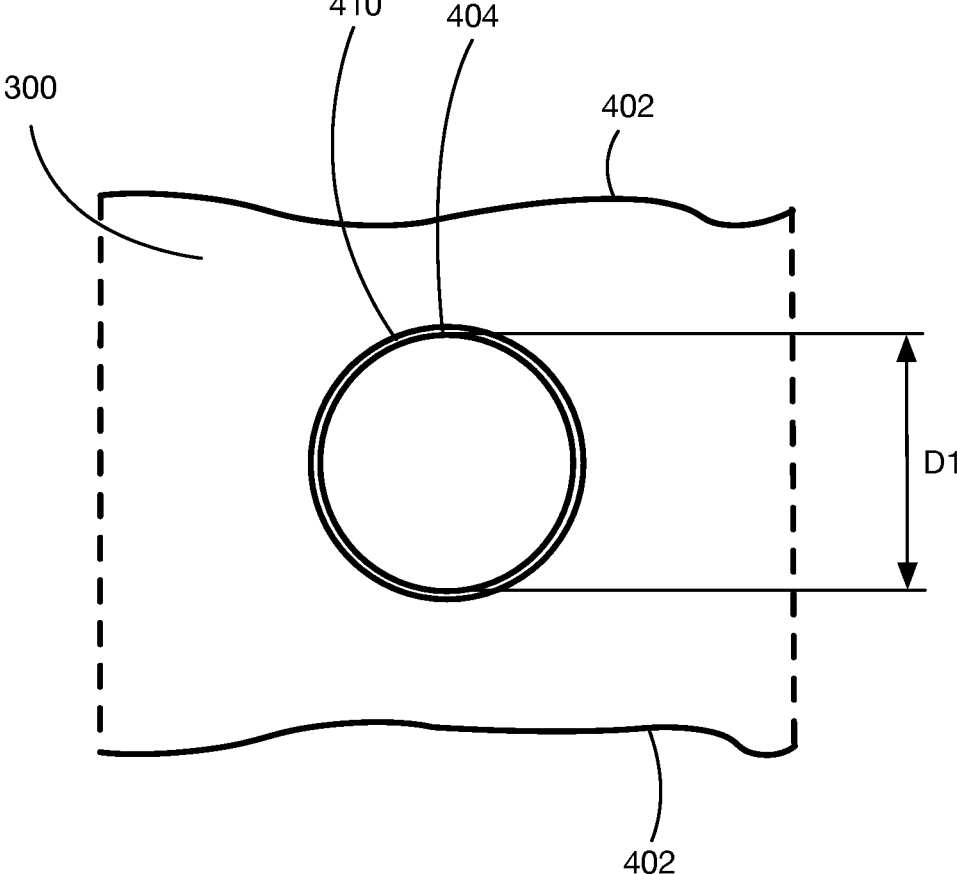
FIG. 4B is a plan view of an embodiment of the cover sheet having a rectangular form.

The outer edge 402 of the cover sheet 300 may have a variety of configurations that define a variety of forms of the sheet 300. The outer edge 402 of the cover sheet 300 has a form that is any one of circular, ovular, elliptical, and square-shaped (see FIG. 4B).

In an embodiment, the outer edge 402 of the cover sheet 300 may be circular, triangular, rectangular or may have any other form.

In an embodiment, as shown in FIG. 4A, the cover sheet 300 is shaped such that at least the outer edge 402 thereof has a shape that is the same as the shape of the inner edge 404 of the cover sheet 300. For example, in the embodiment in FIG. 4A, the shape of the inner edge 404 is circular and the shape of the outer edge 402 is also circular. It should be mentioned that the outer edge 402 is shown in FIG. 4A with ripples and the like so that it does not appear circular even though it is. It should also be mentioned that the inner edge 404 is shown in FIG. 4A as being circular even though in the actual product, it may be rippled and twisted somewhat due to the presence of the elastic member.

As noted above, the inner edge 404 of the cover sheet 300 defines a through-opening 406 of the cover sheet 300, where the inner edge 404 includes an elastic member 410 connected thereto.

Figure 5:
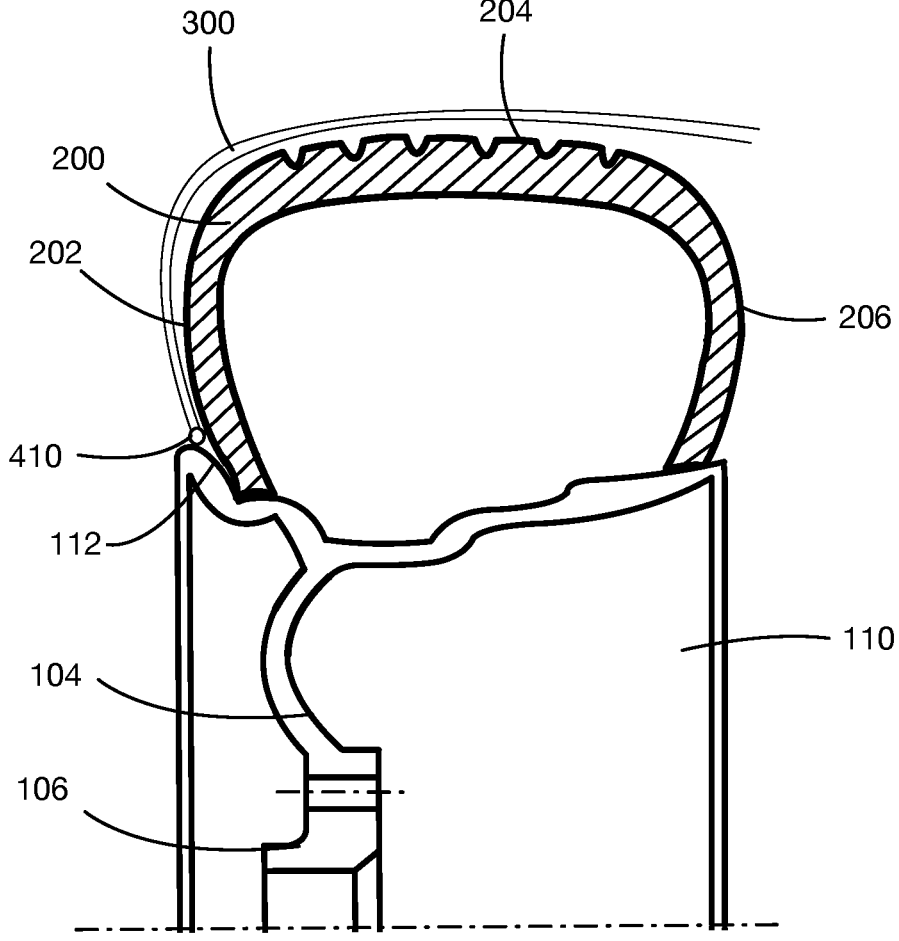
FIG. 5 shows a cross-sectional view of the elastic member and cover sheet stretched around the wheel rim of the vehicle wheel shown in FIG. 1.

In the embodiment provided in FIG. 4A-5, the elastic member 410 is a length of flexible elastic (e.g. elastomeric) material having a substantially circular cross-sectional shape. The elastic member 410 is connected at the inner edge 404 of the cover sheet 300.

In an alternate embodiment, (not shown) the elastic member 410 has the form of a wide, stretchable band with a thin, non-circular cross-section.

In an embodiment shown in FIG. 4A, an inner surface of the elastic member 410 defines a diameter D1 that is at most as large as an outer circumference of the outboard flange 112.

As shown in FIG. 5, the through-opening 406 and the elastic member 410 are sized such that the elastic member 410 can be stretched to encircle the outboard flange 112 of the wheel rim 110.

It will be understood that the elastic member 410 can be connected at the inner edge 404 of the cover sheet 300 in various ways. In an embodiment shown in FIG. 4C, the elastic member 410 is a continuous band of elastic material having a circular cross section, and an inner surface 418 of the cover sheet 300 is secured to an outer surface 414 of the elastic member 410 (e.g. via an adhesive or by sewing). The surfaces of the cover sheet 300 can be secured to the elastic member 410 in various ways. For example, the inner surface 418 of the cover sheet 300 can be stitched (i.e. sewn) onto the outer surface 414 of the elastic member 410, where the stitching (or similar connection) is formed at a short distance inwardly from the inner edge 404 of the cover sheet 300 that defines the periphery of the through-opening 406.

In an embodiment shown in FIG. 4D, the elastic member 410 has a form that includes a slot defined by slot walls 412, which receives the inner edge 404 of the cover sheet 300.

In some embodiments, such as that shown in FIGS. 4A-4D, the elastic member 410 sits radially inwardly of the inner edge 404 of the cover sheet 300. In such embodiments, the elastic member 410 defines the through-opening. In FIG. 5, the elastic member is connected to the cover sheet 300 at the inner edge 404, but is positioned radially outward from the inner edge 404 and so the inner edge 404 defines the through-opening 406.

In some embodiments of the cover sheet 300, the material of the cover sheet 300 itself is substantially non-elastic. In these embodiments, the material of the cover sheet is non-elastic to such an extent that only the elastic member 410 will noticeably flex to extend around the outboard flange 112 of the wheel rim 110. In these embodiments, the cover sheet 300 is connected to the elastic member 410 in a manner as described above, such that a plurality of folds are present in the material of the cover sheet 300. In this embodiment, as the elastic member 410 is stretched around a outboard flange of the wheel rim 110, there is sufficient excess sheet material connected to the elastic member 410 such that the cover sheet 300 will at least partially unfold out as the elastic member 410 is stretched.

As shown in FIG. 5, the elastic member 410 is elastic and the cover sheet 300 is sized such that the elastic member 410 can be stretched around the outer edge of the outboard flange 112 of the wheel rim 110 such that the outboard flange 112 is circumferentially surrounded by the elastic member 410 and the inner edge of the cover sheet 300. In this embodiment, the through-opening 406 and elastic member 410 can stretch to an extent such that the recess and elastic member 410 become larger than an outer circumference of the wheel rim 110.

Figures 7A, 7B:
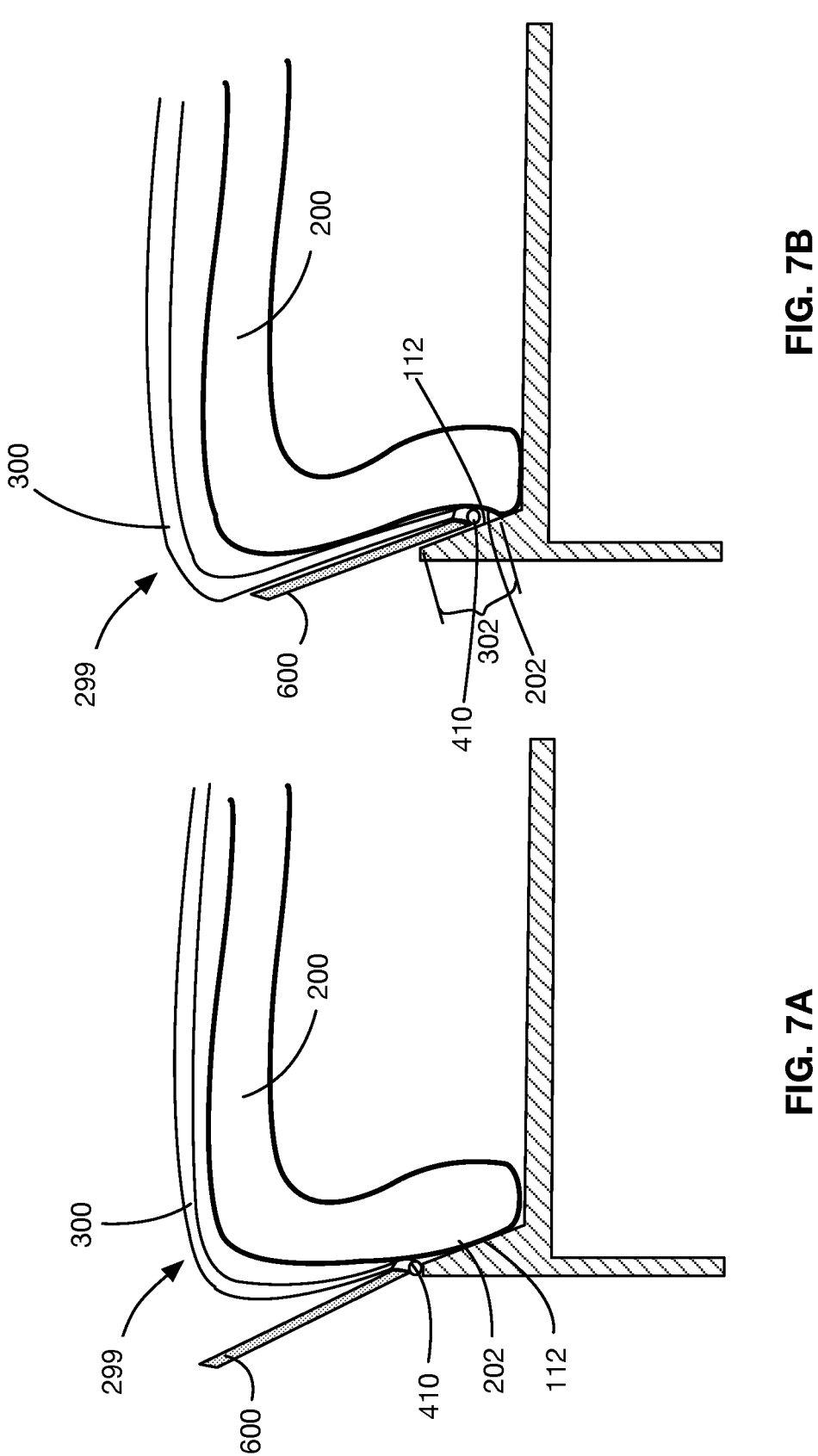
FIG. 7A shows a cross-sectional diagram of one of the cards contacting the elastic member stretched around the wheel rim of the vehicle wheel.
FIG. 7B shows a cross-sectional diagram of one of the cards and the elastic member secured between the tire and rim of the vehicle wheel.

In the embodiment shown in FIGS. 5 and 7A, the elastic member 410 of the cover sheet 300 is pulled over the outboard flange 112 of the wheel rim 110 until the sheet 300 is on the surface of the wheel rim 110, adjacent the outboard flange 112 of the wheel rim 110. The elastic member 410 is brought into proximity of the interface 210 between the outboard flange 112 and the outboard side 202 of the tire 200. In the embodiment shown in FIG. 7A, the elastic member 410 of the cover sheet 300 has been pulled over the outboard flange 112 of the wheel rim 110 until the cover sheet 300 is on the radially outer edge of the wheel rim 110, adjacent the interface 210 between the outboard flange 112 and the outboard side 202 of the tire 200.

As disclosed above, in addition to the cover sheet 300, the protective kit for a vehicle wheel also comprises a plurality of cards 600, several embodiments of which are shown in FIGS. 6A and 6B. Each of the plurality of semi rigid cards 600 can have a variety of different forms, including but not limited to the circular and rectangular forms shown in FIGS. 6A and 6B. Each of the plurality of cards 600 is sufficiently rigid and sufficiently thin to drive and hold the wheel cover member 299 between the outboard side 202 of the tire 200 and the outboard flange 112 of the wheel rim 110, thereby separating the outboard flange 112 of the wheel rim 110 from the outboard side 202 of the tire 200 with the wheel cover member. This permits the user to apply a coating (e.g. paint) to the wheel rim 110, in particular the outboard surfaces of the wheel rim 110 without getting the coating on the tire 200.

Figure 8:
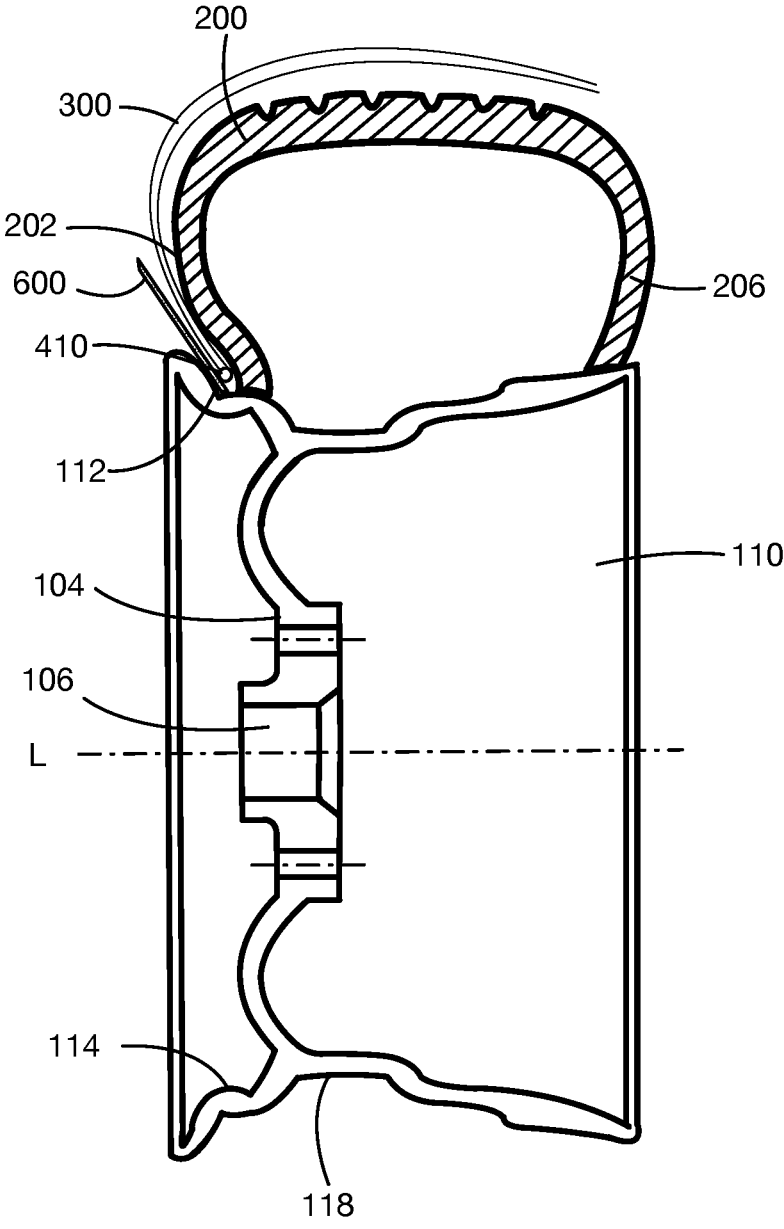
FIG. 8 shows a cross-sectional view of the elastic member and one of the cards secured between the tire and rim of the vehicle wheel.

As shown in FIG. 8, the plurality of cards 600 are a plurality of rectangular, semi-rigid cards 600 that have been wedged, with the elastic member 410 and/or a portion of the cover sheet 300, between the at least a portion of the wheel rim 110 and the outboard side 202 of the tire 200.

The plurality of cards 600 can have a variety of forms and thicknesses, provided the card 600 can still be inserted between the outboard side 202 of the tire 200 and the at least a portion of the wheel rim 110 to urge the at least a portion of the elastic member 410 between the wheel rim 110 and the tire 200.

Each of the plurality of cards 600 has a selected rigidity and a selected thickness so as to be pushable against the wheel cover member 299 in between the outboard side 202 of the tire 200 and the outboard flange 112 of the wheel rim 110, so as to drive the wheel cover member 299 radially inwardly between the outboard side 202 of the tire 200 and the outboard flange 112 of the wheel rim 110, thereby separating at least a radially outer portion (shown at 302 in FIG. 7B) of the outboard flange 112 of the wheel rim 110 from the outboard side 202 of the tire 200 with the wheel cover member 299. The specific thickness and the specific rigidity of each of the plurality of driving cards 600 may depend on the particular amount of force with which the outboard flange 112 of the wheel rim 110 from the outboard side 202 of the tire 200 are engaged with one another and the particular shape of the radially outer edge of the outboard flange 112 of the wheel rim 110.

Next, a procedure for mounting the protective kit on a wheel of vehicle, including the mounting of the cover sheet 300 and the plurality of cards, will be described with reference to FIGS. 7A to 9.

In an embodiment, the wheel rim is prepared for painting prior to application of the protective kit by cleaning dirt and debris from its surface, by removing grease or roughening the surface.

In an embodiment, the air within the tire mounted on the wheel rim of the wheel is at least partially released therefrom, prior to the application of the protective kit to the wheel.

In a first step, the recess and elastic member 410 of the sheet are stretched to a diameter that is larger than the outer circumference of the outboard flange of the wheel rim.

As shown in FIGS. 7A and 7B. the elastic member 410 and cover sheet 300 are slipped around the outer edge 113 of the outboard flange 112 of the wheel rim 110 so that the elastic member 410 sits proximate the interface 210 of the outboard side 202 of the tire 200 and the outboard flange 112 of the wheel rim 110.

At least one of the cards 600 is brought into contact with a portion of the elastic member 410. Each of the plurality of cards 600 are sufficiently rigid so that each card 600 can be used to drive the at least a portion of the elastic member 410 between the outboard side 202 of the tire 200 and the outboard flange 112 of the wheel rim 110 by resiliently separating the outboard side 202 of the tire 200 and the outboard flange 112 of the wheel rim 110.

From this step, the at least one card 600 and the elastic member 410 connected to the inner edge of the sheet become releasably secured within the separation of the outboard side 202 of the tire 200 and the outboard flange 112.

In an embodiment, additional cards 600 can then be used to urge additional portions of the elastic member 410 between the outboard side 202 of the tire 200 and the outboard flange 112 by resiliently separating the outboard side 202 of the tire 200 and the outboard flange 112. A given number of the plurality of cards 600 are used to releasably secure the elastic member 410 between the outboard side 202 of the tire 200 and the outboard flange, as shown FIG. 8.

The number of the plurality of cards 600 is whatever number is sufficient to releasably secure the number of portions of the elastic member 410 between the outboard side 202 of the tire 200 and the outboard flange 112 of the wheel rim 110.

Once the elastic member 410 and the at least one card 600 are securely received between the separated outboard side 202 of the tire 200 and the outboard flange, the cover sheet 300 connected to the elastic member 410 is positioned to cover at least a portion of the outboard side 202 of the tire 200. In an embodiment, the sheet 300 extending from the elastic member 410 can be wrapped around at least the outboard side 202 of the tire 200.

In this embodiment, the cover sheet 300 has a surface area that is sufficiently large such that when the sheet 300 is positioned to cover at least a portion of the outboard side 202 of the tire 200, the outer edge 402 of the cover sheet 300 can be pulled to at least an outer edge of the outboard side 202 of the tire 200 to cover the entire outboard side 202 thereof.

The wheel rim 110 can then be painted, with the paint being primarily applied to the outside of the center disk 104, spokes 102, rough-channel 120 and outer lip 114.

As shown in FIG. 8, the at least a portion of the elastic member 410 becomes releasably secured within the at least partial separation between the outboard side 202 of the tire

200 and the outboard flange 112 of the wheel rim 110. As shown in this embodiment, at least a portion of the card 600 is also releasably secured within the partial separation of the outboard side 202 of the tire 200 and the outboard flange 112 of the wheel rim 110.

As shown in FIGS. 7B and 9, the plurality of cards 600 are also sufficiently rigid so as to secure the at least a portion of the elastic member 410 against the wheel rim 110 of the tire 112. As each card 600 is utilized to contact a portion of the elastic member 410 and separate the resiliently engaged surfaces of the tire 200 and the wheel rim 110, the card 600 and portion of the elastic member 410 are wedged between the interface formed therebetween, and a radial pressing force is applied to the elastic member 410 and the card 600 by the wheel rim 110 and the tire 200.

Once the elastic member 410 and plurality of cards 600 are releasably secured between the outboard side 202 of the tire 200 and the outboard flange 112 of the wheel rim 110, the outer edge 402 of the sheet 300 can be pulled to extend and cover at least the outboard side 202 of the tire 200.

Various shapes or forms of the cover sheet 300 may suitably fit around at least the outboard side 202 of the tire 200 for the protection thereof.

In an additional embodiment, the cover sheet 300 is shaped such that the cover sheet 300 can be pulled to extend around and to cover both the outboard side 202 and at least a portion of a radial outer surface 204 of the tire 200.

In an additional embodiment, the cover sheet 300 is shaped such that the cover sheet 300 can be pulled to extend around and to cover each of the front 202 and radial outer 204 surfaces, and at least a portion of a rear surface 206 of the tire 200.

In an additional embodiment, the cover sheet 300 is shaped such that the cover sheet 300 can be pulled to extend around and to cover the front 202, the radial outer 204 and the rear 206 surfaces of the tire 200, and to be at least partially tucked through a rear portion of the wheel rim 110 such that a portion of the cover sheet 300 is disposed in the through-channel 120 of the wheel rim 110. In this embodiment, the cover sheet 300 is sized such that when the elastic member 410 is secured around the outboard flange 112 of the wheel rim 110, the cover sheet 300 can itself be wrapped around to the back of the tire 200 such that portions of the sheet 300 are tucked into a rear portion (e.g., the through-channel 120) of the wheel rim 110. The cover sheet 300 can be tucked into the through-channel 120 to cover and protect a brake caliper and other internal mechanisms of the vehicle that are mounted behind the wheel rim 110 of the wheel. In this way, the cover sheet 300 will prevent paint from travelling along the through-channel 120 of the wheel rim 110 and landing on the brake caliper and other internal mechanisms that are positioned internally relative to the wheel of the vehicle.

Figure 10:
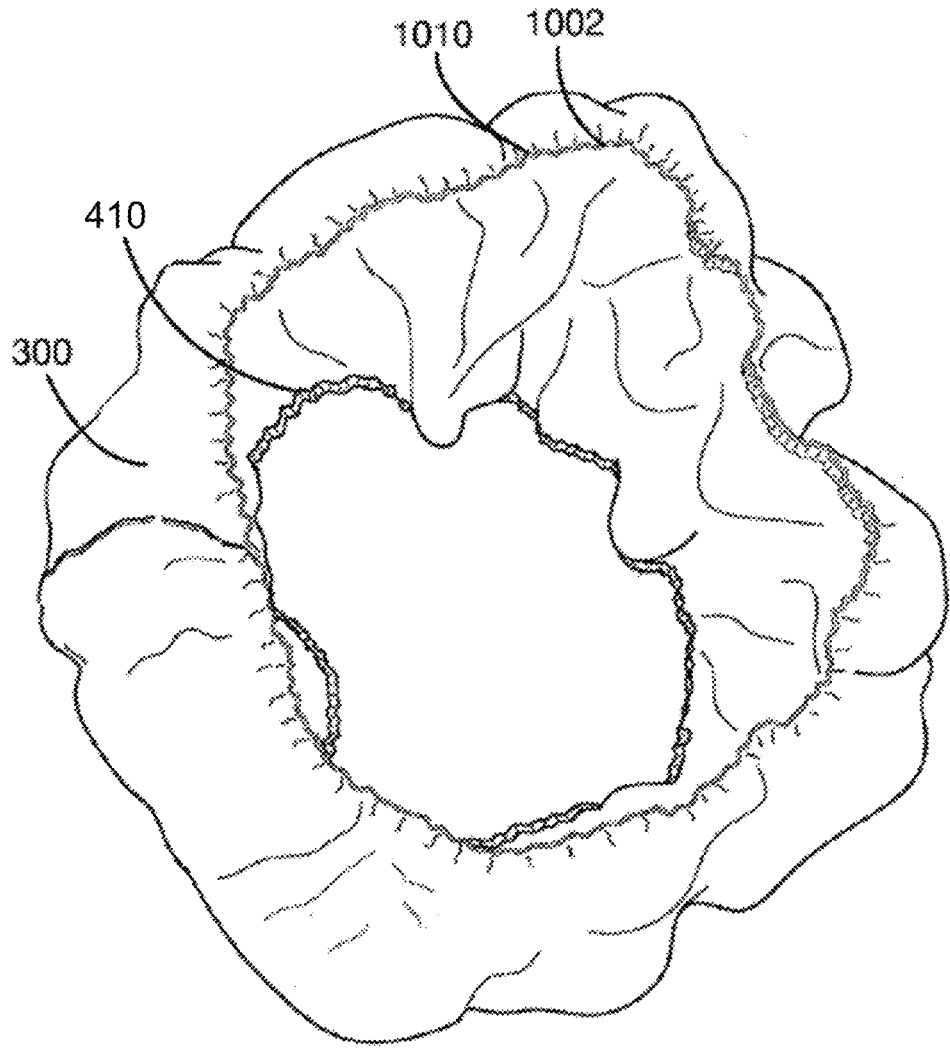
FIG. 10 shows an embodiment of the cover sheet including an outer edge elastic member.

In an embodiment shown in FIG. 10 the outer edge is one outer edge 1002 defining an approximately circular form to the sheet 300, where the outer edge 1002 includes an outer elastic member 1010 being connected thereto. In this embodiment, the outer elastic member 1010 connected to the outer edge 1002 of the cover sheet 300 facilitates a secure enveloping of the tire 200 by the cover sheet 300. For example, if the cover sheet 300 is formed to extend to a rear surface 206 of the tire 200, the outer elastic member 1010 will more closely hug the surface of the tire (compared to the sheet without an outer elastic member) thereby facilitating better retention between the cover sheet 300 and the tire 200.

What is claimed is:

1. A protective kit for a vehicle wheel, the vehicle wheel including a wheel rim and having a tire mounted thereon, wherein the tire is pressurized, such that an outboard flange of the wheel rim and an outboard side of the tire are resiliently engaged with one another and are separable, the protective kit comprising:

a wheel cover member that includes a cover sheet and an elastic member, the cover sheet has an outer edge and an inner edge, and has a through-opening passing therethrough that is defined by the inner edge, wherein the elastic member is connected to the cover sheet at the inner edge, the through-opening and the elastic member being sized to be openable to encircle the outboard flange of the wheel rim; and a plurality of driving cards, each of the plurality of cards having a selected rigidity and a selected thickness so as to be pushable against the wheel cover member in between the outboard side of the tire and the outboard flange of the wheel rim, so as to drive the wheel cover member radially inwardly between the outboard side of the tire and the outboard flange of the wheel rim, thereby separating at least a radially outer portion of the outboard flange of the wheel rim from the outboard side of the tire with the wheel cover member.

2. The protective kit according to claim 1, wherein the cover sheet is formed of at least one plastic material.

3. The protective kit according to claim 1, wherein the cover sheet is sized such that when the elastic member is releasably secured between the outboard flange of the wheel rim and the outboard side of the tire, the cover sheet will extend around to a back of the tire such that a portion of the cover sheet can be tucked into a rear portion of the wheel rim.

4. The protective kit according to claim 1, wherein the outer edge of the cover sheet is circular.

5. The protective kit according to claim 1, wherein the inner edge of the cover sheet is connected an outer surface of the elastic member.

6. The protective kit according to claim 1, wherein the through-opening is circular.

7. The protective kit according to claim 1, wherein each of the driving cards has a width, and a sum of the widths of all the driving cards is less than a circumference of the outboard flange of the wheel rim.

8. The protective kit according to claim 1, wherein the elastic member has a form that includes a slot that receives the inner edge of the cover sheet.

\* \* \* \* \*